United States Patent
Ohsugi

(10) Patent No.: US 9,690,183 B2
(45) Date of Patent: Jun. 27, 2017

(54) DISPLAY APPARATUS INCLUDING IMAGE PROJECTING UNIT AND SCREEN UNIT

(71) Applicant: CASIO COMPUTER CO., LTD., Shibuya-ku, Tokyo (JP)

(72) Inventor: Naohiro Ohsugi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/854,940

(22) Filed: Sep. 15, 2015

(65) Prior Publication Data

US 2016/0097970 A1    Apr. 7, 2016

(30) Foreign Application Priority Data

Oct. 7, 2014  (JP) ................................ 2014-206712
Jul. 29, 2015 (JP) ................................ 2015-149610

(51) Int. Cl.
| | |
|---|---|
| *H04N 5/74* | (2006.01) |
| *G03B 21/606* | (2014.01) |
| *H04N 9/31* | (2006.01) |
| *G09G 3/00* | (2006.01) |
| *G03B 21/10* | (2006.01) |
| *G03B 21/62* | (2014.01) |
| *G03B 31/00* | (2006.01) |

(52) U.S. Cl.
CPC ........... *G03B 21/606* (2013.01); *G03B 21/10* (2013.01); *G03B 21/62* (2013.01); *G03B 31/00* (2013.01); *G09G 3/002* (2013.01); *H04N 9/3185* (2013.01)

(58) Field of Classification Search
CPC .. H04N 9/3185; H04N 5/7441; H04N 5/7458; H04N 9/3197; G03B 21/606; G03B 21/625; G06F 3/14; G02F 1/133526; G09G 3/346

USPC .......................................... 348/759, 744, 745
See application file for complete search history.

(56) References Cited

U.S. PATENT DOCUMENTS

| | | | | |
|---|---|---|---|---|
| 6,028,649 A | * | 2/2000 | Faris .................. | G02B 27/0093 348/E13.004 |
| 6,771,419 B1 | * | 8/2004 | Yamagishi ............ | G03B 21/62 348/E9.025 |

(Continued)

FOREIGN PATENT DOCUMENTS

| | | |
|---|---|---|
| JP | 10186507 A | 7/1998 |
| JP | 2006017973 A | 1/2006 |

(Continued)

OTHER PUBLICATIONS

Japanese Office Action (and English translation thereof) dated Sep. 6, 2016, issued in counterpart Japanese Application No. 2015-149610.

*Primary Examiner* — Trang U Tran
(74) *Attorney, Agent, or Firm* — Holtz, Holtz & Volek PC

(57) ABSTRACT

A display apparatus including: an image projecting unit for emitting projection light of an image; and a screen unit including: a Fresnel lens disposed correspondingly to the projection light; and a transmitting diffuser which includes a first display section disposed on a light-emitting side corresponding to a first area of the Fresnel lens and a second display section disposed on a light-emitting side corresponding to a second area different from the first area of the Fresnel lens, a part of the second display section being separated from the Fresnel lens for a predetermined distance.

10 Claims, 8 Drawing Sheets

(56) References Cited

U.S. PATENT DOCUMENTS

| | | | | |
|---|---|---|---|---|
| 2002/0080483 A1* | 6/2002 | Yamaguchi | ............ | G03B 21/62 |
| | | | | 359/456 |
| 2006/0001966 A1 | 1/2006 | Oishi et al. | | |
| 2011/0019270 A1* | 1/2011 | Kitano | .................... | G02B 3/08 |
| | | | | 359/361 |
| 2014/0118831 A1* | 5/2014 | Mizuyama | ........... | G02B 5/0268 |
| | | | | 359/599 |

FOREIGN PATENT DOCUMENTS

| JP | 2007286089 A | 11/2007 |
|---|---|---|
| JP | 2008203597 A | 9/2008 |
| JP | 2011150221 A | 8/2011 |

\* cited by examiner

PRIOR ART

PRIOR ART

DISPLAY APPARATUS INCLUDING IMAGE PROJECTING UNIT AND SCREEN UNIT

CROSS-REFERENCE TO RELATED APPLICATIONS

The entire disclosures of Japanese Patent Application No. 2014-206712 filed on Oct. 7, 2014 and Japanese Patent Application No. 2015-149610 filed on Jul. 29, 2015 including descriptions, claims, drawings and abstracts are incorporated herein by reference in its entirety.

BACKGROUND OF THE INVENTION

1. Field of the Invention

The present invention relates to a display apparatus including an image projecting unit and a screen unit.

2. Description of Related Art

Japanese Unexamined Patent Application Publication No. 2011-150221 discloses a display apparatus which projects personal images onto a board screen in the form of human shape to provide viewers with various types of impressive notifications.

An approach has been studied that involves projection of a personal image onto a three-dimensional screen to give a viewer a lifelike impression.

With reference to FIG. 9, since a screen unit 101 is three-dimensionally formed, even if the projector 100 emits projection light 102 just from behind the screen unit 101, the distance from the screen unit 101 to the projector 100 substantially varies from place to place. Such a variable distance causes distortion of an image projected onto the screen unit 101.

FIG. 10 illustrates an image consisting of evenly partitioned square segments projected from the projector 100 onto the screen unit 101. As understood from FIG. 10, even the evenly partitioned square segments of an original image results in distorted squares 103 on the screen unit 101.

As an alternative, an original image may be corrected in advance to display a distortion-free image on the screen unit 101. This approach requires a cumbersome correction process of the original image, which is thus unacceptable.

The projector 100 may be disposed at a lower position behind a screen to make the projector 100 less bothering. With reference to FIG. 11, the projector 100 emits the projection light 102 obliquely upward toward the screen unit 101, thus increasing angles from the projector 100 to respective positions on the screen unit 101 and significantly distorting the image. At the lower portion of the screen unit 101, the projection light is shaded by the bottom edge of the screen unit 101, and vignetting occurs in an area 104 that the projection light does not reach.

To solve the above-mentioned problems, an object of the invention is to provide a display apparatus that can display images with reduced distortion across a three-dimensional screen unit even without correction of original images.

SUMMARY OF THE INVENTION

According to one aspect of the present invention, there is provided a display apparatus including: an image projecting unit for emitting projection light of an image; and a screen unit including: a Fresnel lens disposed correspondingly to the projection light; and a transmitting diffuser which includes a first display section disposed on a light-emitting side corresponding to a first area of the Fresnel lens and a second display section disposed on a light-emitting side corresponding to a second area different from the first area of the Fresnel lens, a part of the second display section being separated from the Fresnel lens for a predetermined distance.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein.

DETAILED DESCRIPTION OF THE PREFERRED EMBODIMENT

Preferred embodiments for carrying out the invent ion will now be described with reference to the accompanying drawings. While the following embodiments may include various technically favorable limitations to carry out the invention, the scope of the invention should not be limited to the following embodiments or drawings.

Figure 1:
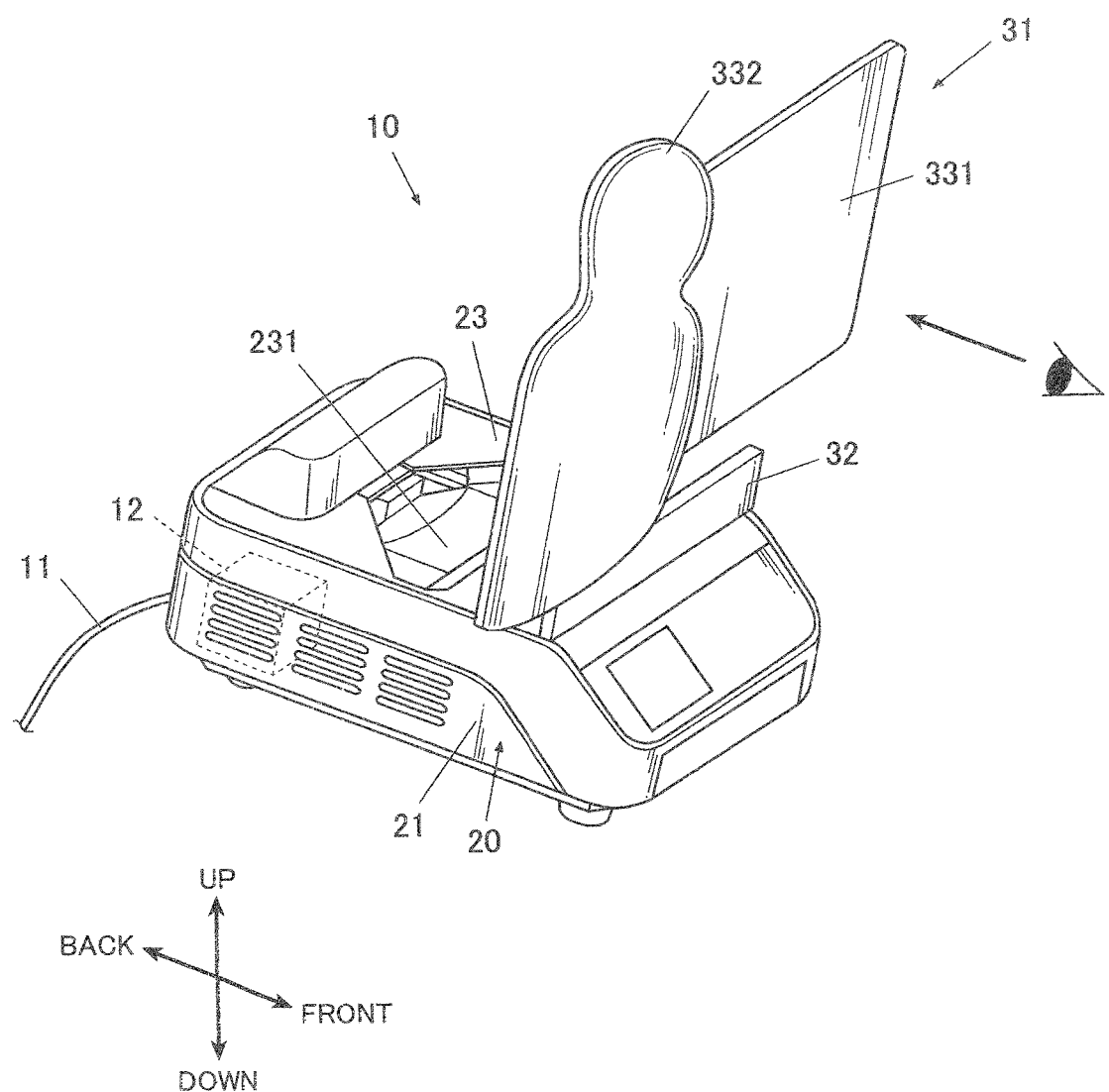
FIG. 1 is a perspective view of a display apparatus according to an embodiment viewed obliquely from above.
Figure 2:
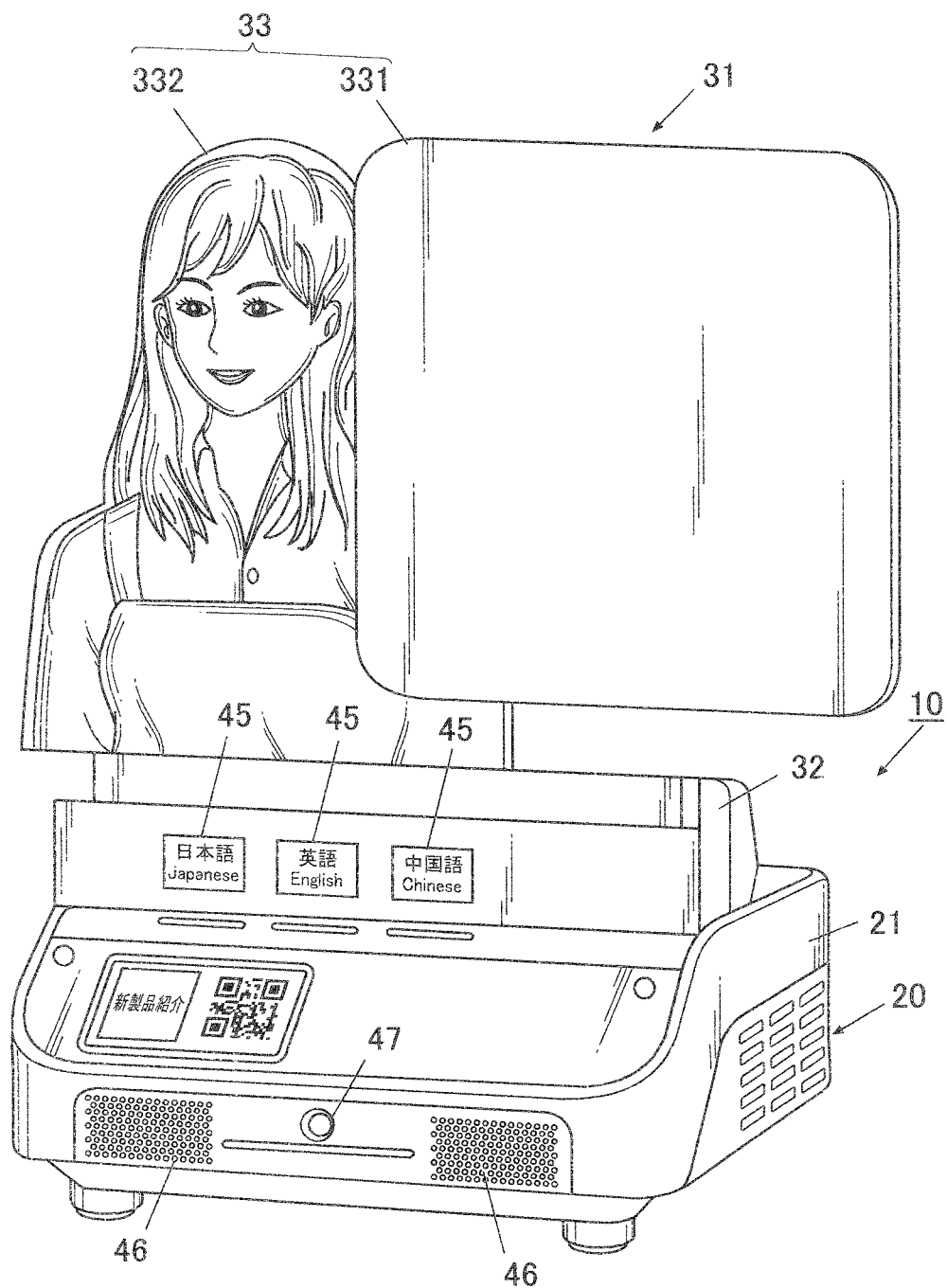
FIG. 2 is a perspective view of the display apparatus according to an embodiment viewed approximately from the front.
Figure 3:
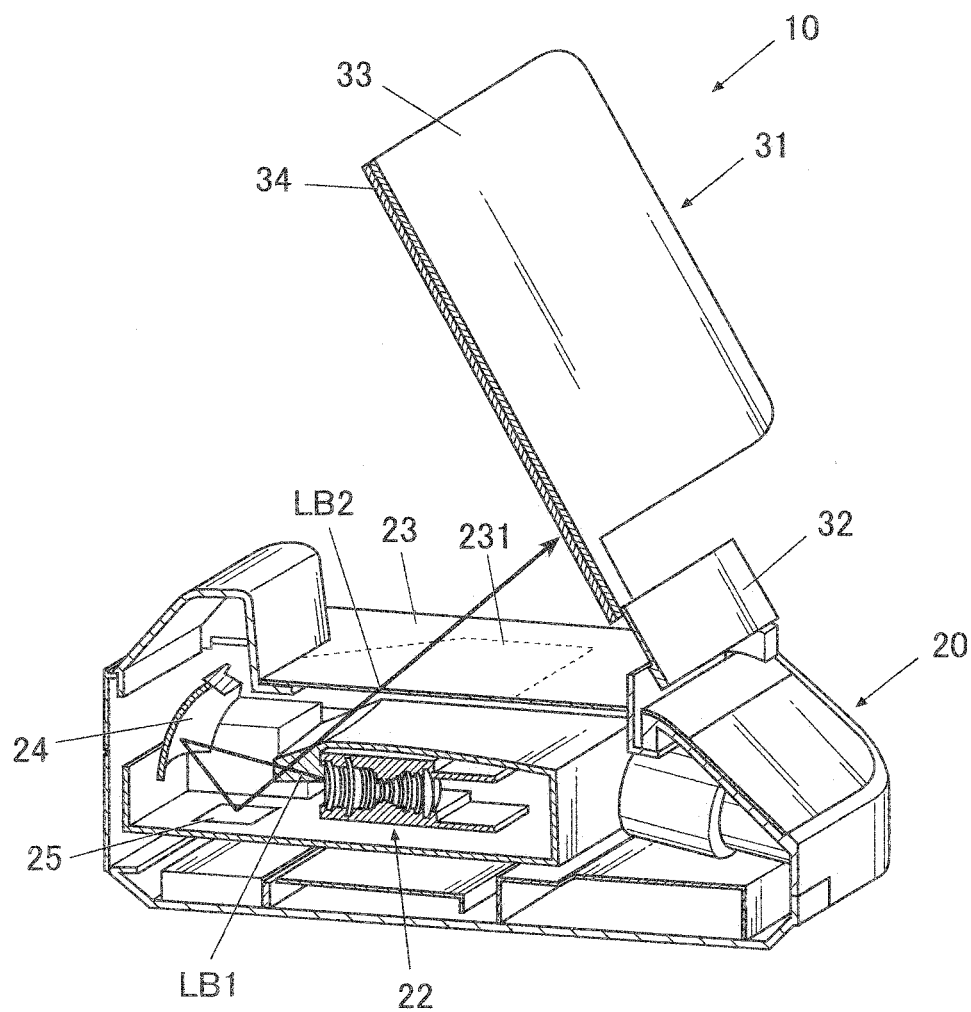
FIG. 3 is a perspective view illustrating an internal structure of the display apparatus according to an embodiment.
Figure 3:
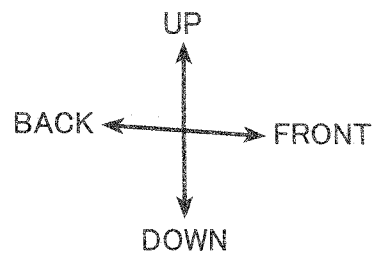

FIG. 1 is a perspective view of a display apparatus 10 according to an embodiment of the invention viewed obliquely from above. FIG. 2 is a perspective view of the display apparatus 10 viewed approximately from the front. FIG. 3 is a perspective view illustrating an internal structure of the display apparatus 10.

The display apparatus 10 may be installed in a store or an exhibition venue for example, and present product explanation, guidance, questionnaire or other commercial contents. Alternatively, the display apparatus may be installed in a nursing home to present contents on brain-activating questions. The display apparatus can have any other application.

While the embodiment employs a screen unit 31 in the form of a human shape as appropriate for displaying a personal image that presents some explanation, guidance or other commercial contents as shown in FIG. 1, the screen unit 31 may have any other shape.

The display apparatus 10 has a cabinet 20 in the form of an approximately rectangular box as a whole.

The display apparatus 10 is equipped with a power cord 11 having a plug (not shown) for receiving power from a commercial power source of a store or an exhibition venue as a main power source and an auxiliary power source 12 (a battery, for example) to be used if the power supply from the main power source is shut down.

The main power source of the display apparatus 10 refers to portions including a power source adapter for converting the power from a commercial power source into a state suitable for driving the display apparatus 10.

One end (right end in FIG. 1) of the cabinet 20 has a screen unit 31 detachably mounted thereto via a screen mount 32. The screen unit 31 may be replaced with one having any shape suitable for a given content.

In the following description, when the cabinet 20 is placed on a disk, the top area or upper side of the cabinet 20 is referred to as "top area or upper side", the portion adjacent to the screen unit 31 as "frontward area or front side", and the portion away from the screen unit 31 as "backward area or back side".

Operation units 45, voice output units 46 including loudspeakers for outputting voice, and a motion sensor 47 are disposed below the screen mount 32 of the cabinet 20.

The cabinet 20 has a side board 21 surrounding its periphery from four sides and has an opening portion in the top area.

With reference to FIG. 3, the opening portion has a panel 23. The panel 23 has a central transparent unit 231 for transmitting light.

While the portion other than the transparent unit 231 of the panel 23 hides the interior of the cabinet 20 due to black printing, the entire panel 23 may be transparent.

As shown in FIG. 3, in the approximate center of the interior of the cabinet 20, an image projecting unit 22 is disposed for generating and emitting projection light toward the backward area of the cabinet 20 in a lower area behind the screen unit 31.

A first mirror 24 having a concave reflective surface is disposed in the backward area of the cabinet 20. The first mirror 24 reflects the projection light from the image projecting unit 22 toward a second mirror 25 having a flat reflective surface, which reflects the light toward the screen unit 31.

The projection light beams LB1 to produce an image is emitted from the image projecting unit 22, reflected downward at a first mirror 24, reflected upward at a second mirror 25, and then projected, as projection light beams LB2, onto the screen unit 31 disposed external to the cabinet 20 through the transparent unit 231 of the panel 23. The screen unit 31 receives the projection light emitted from the projecting unit 22 on its back surface and displays the produced image on its front surface.

Figure 4:
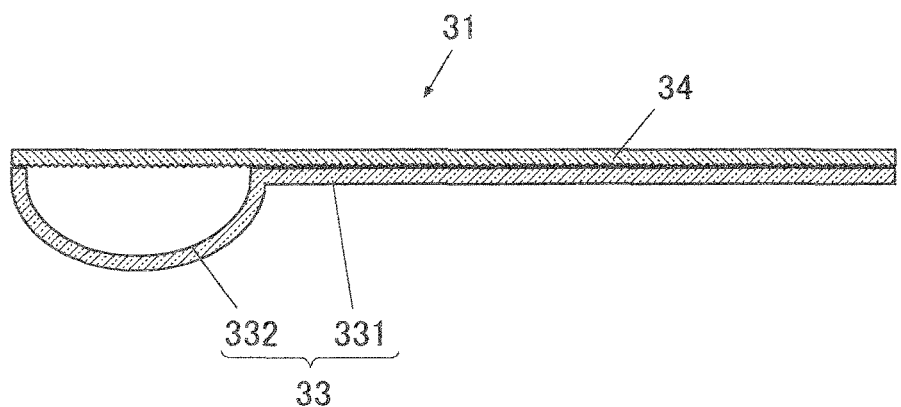
FIG. 4 is a cross-sectional view of a screen unit according to an embodiment.

FIG. 4 is a downward cross-sectional view of the screen unit 31.

The screen unit 31 includes a transmitting diffuser 33 that may be composed of an acrylic board and a Fresnel lens 34 disposed behind the transmitting diffuser 33.

The transmitting diffuser 33 includes a flat section (first display section) 331 disposed on a light-emitting side corresponding to a first area of the Fresnel lens 34 and a bulged section 332 (second display section) which is disposed on a light-emitting side corresponding to a second area different from the first area of the Fresnel lens 34 and three-dimensionally formed so as to have a convex shape protruding forward, a part of the bulged section 332 being separated from the Fresnel lens for a predetermined distance. Since the flat section 331 is a notification section to display various pieces of information, the flat section 331 has a flat surface to ensure visibility. The bulged section 332 has a hollow shape with its back side left open. The bulged section 332 is a part to project the projection light to produce a personal image and preferably has a three-dimensional shape more resembling a human body for enhanced reality.

Relevant contents are displayed on the flat section 331 and the bulged section 332. Light is projected onto the bulged section 332 as if a personal image appearing on the bulged section 332 aurally communicate the information projected onto the flat section 331. To be more specific, the display apparatus 10 includes a voice output unit including a loudspeaker or such like, and the lips of a personal or character image projected onto the bulged section 332 move in synchronization with the voice that comes from the voice output unit corresponding to the information projected onto the flat section 331. The movement of the lips stops when the output of voice from the voice output unit ends. In this way, the mouth of a personal or character image appearing on the second display section moves in accordance with the voice from the voice output unit.

A personal or character image corresponding to the information projected onto the flat section 331 may be projected onto the bulged section 332. If the information projected onto the flat section 331 is product explanation of bread, a personal or character image in clothing of a baker may be projected onto the bulged section 332. If the information projected onto the flat section 331 is product explanation of fish, a personal or character image in clothing of a fishmonger may be projected onto the bulged section 332. This makes the flat section 331 and the bulged section 332 be the display sections more related to each other and thus enhances customer appeal to users.

At least a part of the bulged section 332 of the transmitting diffuser 33 preferably has a matte-processed surface. Matte processing suppresses reflection of external light from the surface of the transmitting diffuser 33, thus keeping a clear presented image.

The Fresnel lens 34 has a plate shape to cover the entire back side of the transmitting diffuser 33. To be more specific, the transmitting diffuser 33 of the Fresnel lens 34 as a light-emitting side has a sawtooth-shaped cross section. The image projecting unit 22 of the Fresnel lens 34 has a flat surface. The Fresnel lens 34 may have any different shape. In an inverted configuration, the transmitting diffuser 33 side of the Fresnel lens 34 may have a flat surface and the image projecting unit 22 side of the Fresnel lens 34 may have a sawtooth-shaped cross section. Alternatively, each surface of the Fresnel lens 34 may have a sawtooth-shaped cross section.

Figure 5:
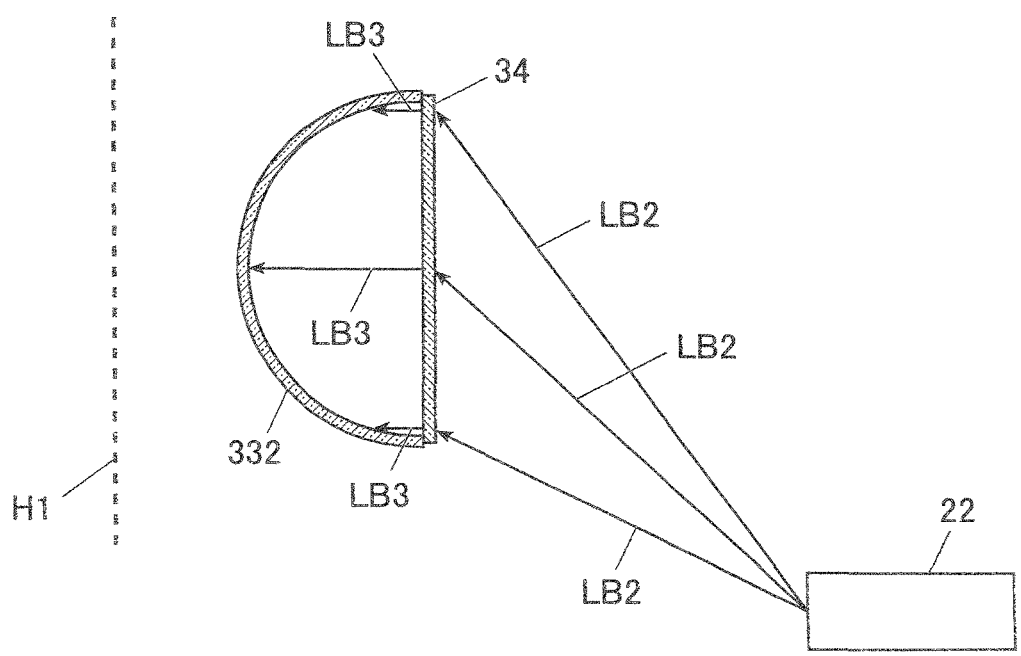
FIG. 5 is a cross-sectional view schematically showing the relation between a bulged section of a transmitting diffuser and a Fresnel lens according to an embodiment.

FIG. 5 is a cross-sectional view schematically showing the relation between the bulged section 332 of the transmitting diffuser 33 and the Fresnel lens 34. This embodiment illustrates a case where the bulged section 332 is formed into a curved shape. A part of the bulged section 332 of the transmitting diffuser 33 is separated for a predetermined distance from the Fresnel lens 34. The image projecting unit 22 has a projection lens. The screen unit 31 is disposed above the optical axis of the projection lens of the image projecting unit 22. In other words, the image projecting unit 22 is disposed below the screen unit 31 as a shift optical system. The Fresnel lens 34 is disposed approximately perpendicular to the optical axis of the light projected from the projection lens of the image projecting unit 22. The Fresnel lens 34 refracts projection light beams LB2 from the image projecting unit 22 at a predetermined angle to convert the light beams into substantially parallel light beams. It should be preferred that a viewer watches a precise image from a position in a virtual plane H1 confronting the image in order to appreciate the image on the screen unit 31 just in front. Thus, the Fresnel lens 34 is configured to convert the projection light beams LB2 into parallel light beams substantially perpendicular to the virtual plane H1 (parallel light beams LB3 shown in FIG. 5).

It should be noted that the parallel light beams LB3 may not be necessarily parallel light beams. Users typically watch the screen unit 31 at higher viewing points than the screen unit 31 in usual cases. The projection light beams LB2 may be slightly diverging near-parallel beams in the direction of user's line of sight, for example, 10 degrees upward from a direction approximately perpendicular to the screen unit 31, through the Fresnel lens 34.

Figure 6:
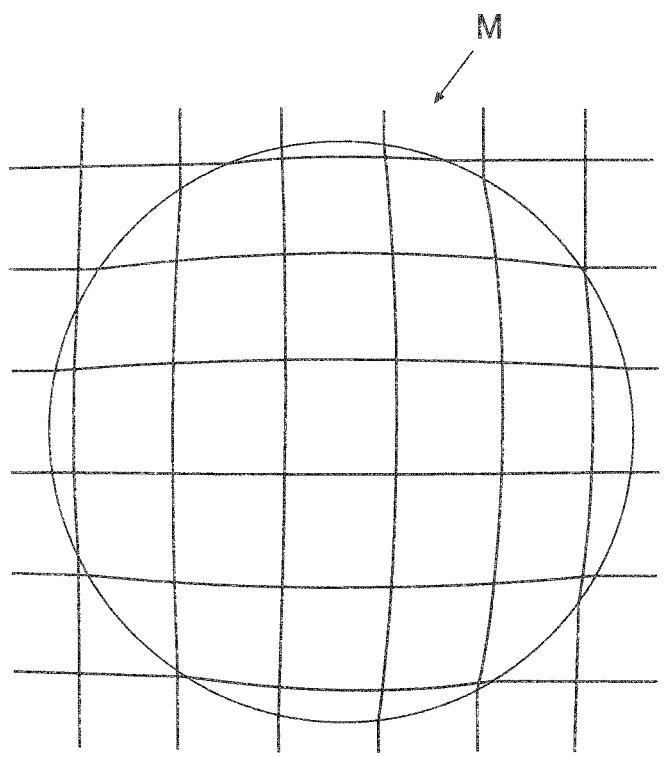
FIG. 6 illustrates an image consisting of square segments projected from a projector onto a bulged section of the screen unit according to an embodiment.
Figure 9:
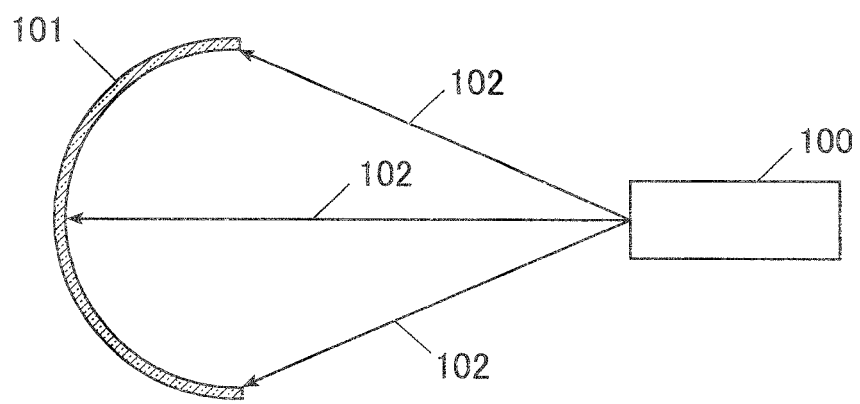
FIG. 9 is a schematic view showing the relation between a traditional three-dimensional screen unit and a projector.
Figure 10:
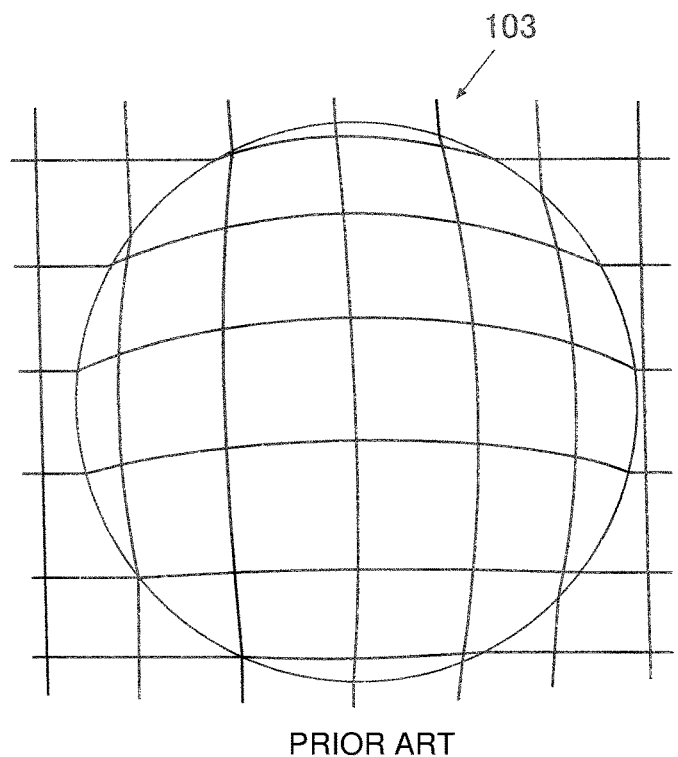
FIG. 10 illustrates a distorted image projected onto the screen unit of FIG. 9.
Figure 11:
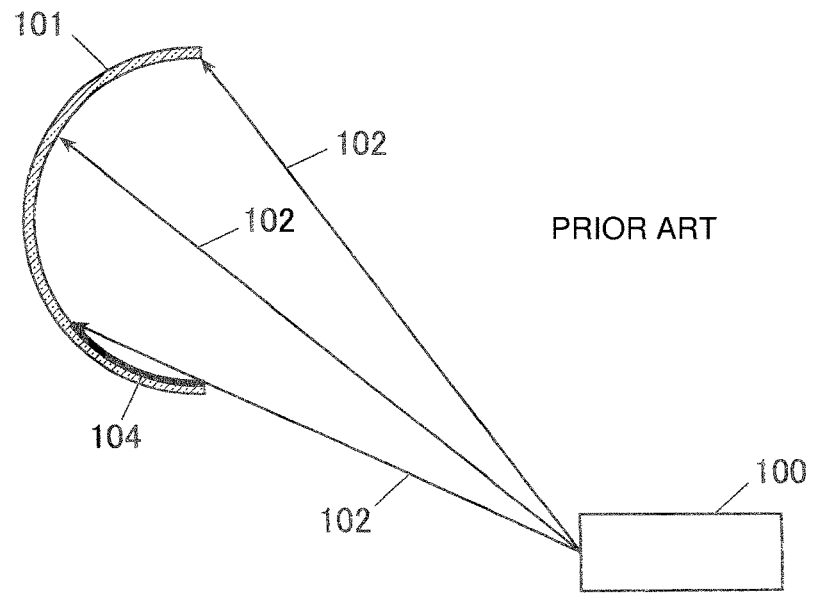
FIG. 11 is a schematic view showing the relation between a traditional three-dimensional screen unit and a projector.

FIG. 6 illustrates an image which consists of evenly partitioned square segments, is projected from the image projecting unit 22 onto the bulged section 332 of the screen unit 31, and is displayed on the bulged section 332. In this embodiment, the shape of the bulged section 332 is the same as the shape of the screen unit 101 shown either in FIG. 9 or FIG. 11, and the original image is the same. As shown in FIG. 6, parallel light beams converted through the Fresnel lens 34 produces square segments M with reduced distortion compared to ones shown in FIG. 10.

With reference to FIGS. 1 to 3, the screen unit 31 is supported by the screen mount 32 so as to be rotatable. The screen unit 31 is erected in use and is laid toward the cabinet 20 in non-use.

Thus, the screen unit 31 may be laid toward the cabinet 20 so as not to become an encumbrance when transporting the display apparatus 10, for example.

Figure 7:
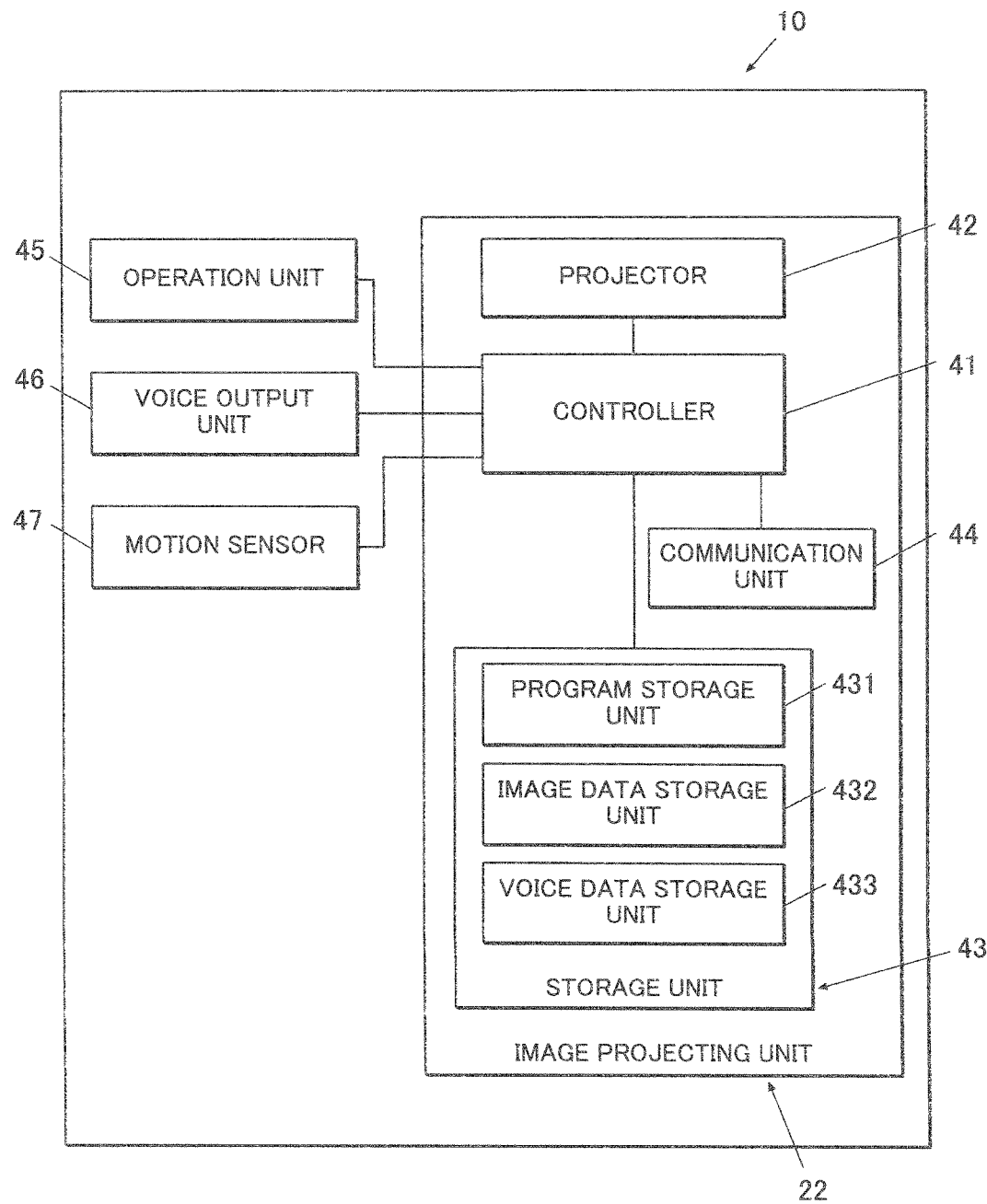
FIG. 7 is a block diagram of a main control configuration of the display apparatus according to an embodiment.

With reference to the block diagram of FIG. 7, main components of the display apparatus 10 according to an embodiment of the invention will be detailed.

The image projecting unit 22 includes, as main components, a controller 41, a projector 42, a storage unit 43, and a communication unit 44. The projector 42, the storage unit 43, and the communication unit 44 are each connected to the controller 41. Operation units 45, a voice output unit 46, and a motion sensor 47 are connected to the controller 41.

The controller 41 includes a CPU for executing various types of programs stored in the storage unit 43 to perform predetermined arithmetic operations or control the above components, and a memory serving as a work area for program execution (not shown either).

The controller 41 controls the individual components in cooperation with programs stored in a program storage unit 431 in the storage unit 43.

The projector 42 is an image projecting device that converts image data outputted from the controller 41 into projection light and emits the light toward the screen unit 31.

For example, the projector 42 may be a Digital Light Processing (DLP™) projector that includes a digital micromirror device (DMD), which is a display device that performs display operation by individual on/off operation of each inclination angle of microscopic mirrors disposed in an array (1024 pixels laterally by 768 pixels longitudinally for XGA) at a high speed to form a light image from the reflected light.

The storage unit 43 may be an HDD or a nonvolatile semiconductor memory or such like and includes a program storage unit 431, an image data storage unit 432, a voice data storage unit 433 and such like.

The program storage unit 431 may store system programs or various processing programs to be executed by the controller 41 and data necessary to execute these programs.

The image data storage unit 432 may store image data to be displayed when contents are played back.

The voice data storage unit 433 may store voice data for outputting voice of contents.

The communication unit 44 may transmit/receive data to external information terminals (not shown).

Applicable communication schemes are not particularly limited and may be wireless LAN, Bluetooth™ or wireless connections via NFC, or may be wired connections using USB cables.

The communication unit 44 may function as a data reception unit that receives data of new contents to be displayed on the screen unit 31 and stores the data into the image data storage unit 432 or the voice data storage unit 433.

The operation of this embodiment will now be described.

When the motion sensor 47 detects a viewer, and the detection signal is input to the controller 41 or an operation unit 45 is operated to input the operation signal to the controller 41, the controller 41 reads out predetermined image data and voice data and controls the projector 42 and the voice output unit 46 to play back a predetermined content.

This causes a projection light to be projected onto the screen unit 31. In the meantime, the controller 41 does not correct an image corresponding to the flat section 331 or an image corresponding to the bulged section 332 in accordance with the shape of the flat section 331 or the bulged section 332.

As mentioned above, the projection light projected by the projector 42 has been converted into parallel light approximately perpendicular to the Fresnel lens 34 and the virtual plane H1, so that a distortion-free image is projected over the entire screen unit 31.

As mentioned above, the Fresnel lens 34 in this embodiment is disposed behind the transmitting diffuser 33 such that at least a part of the Fresnel lens 34 is disposed away from the bulged section 332 of the transmitting diffuser 33. The Fresnel lens 34 converts the projection light from the image projecting unit 22 into parallel light and guides the parallel light toward the bulged section 332. The parallel projection light is projected onto the bulged section 332. This displays an image with reduced distortion on the bulged section 332. Accordingly, an image with reduced distortion can be displayed on the three-dimensional screen unit 31 without correction of the original image.

The parallel projection light is projected onto the bulged section 332. This prevents the projection light reaching the Fresnel lens 34 from being shaded by the peripheral edge of the bulged section 332. An entire image can be displayed over the bulged section 332.

As mentioned above, the Fresnel lens 34 converts the projection light from the image projecting unit 22 into parallel light and guides the parallel light toward the bulged section 332 to display an image over the entire bulged section 332. This configuration allows the image projecting unit 22 to be disposed in a position where a part of the projection light will be probably shaded, namely in a lower area behind the screen unit 31. Disposing the projecting unit 22 in the lower area behind the screen unit 31 makes the image projecting unit 22 less bothering and more compact compared to a case where the image projecting unit 22 is disposed just behind the screen unit 31.

The Fresnel lens 34 converts the projection light from the image projecting unit 22 into parallel light approximately perpendicular to the virtual plane H1 confronting the screen unit 31. Thus, when seen from a position where a viewer is to observe an image (confronting position), an image with least distortion can be displayed on the bulged section 332.

The present invention is not limited to the above embodiment and can be appropriately modified.

Figure 8:
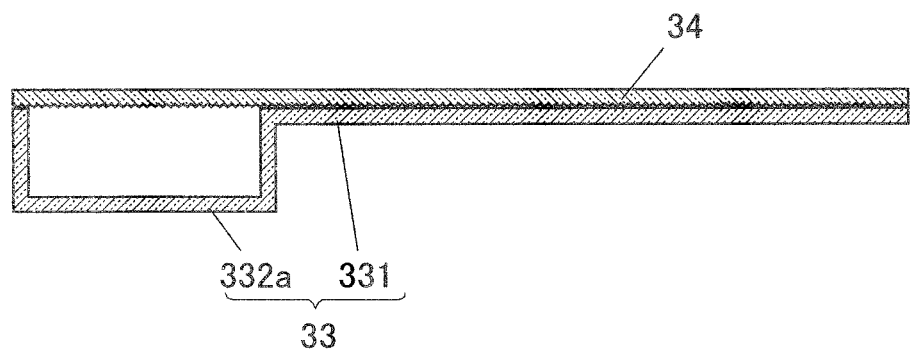
FIG. 8 is a cross-sectional view of a variant of the bulged section.

While the above embodiment illustrates a bulged section 332 formed into a curved surface, the bulged section may have any other convex shape protruding forward. For example, a bulged section 332a may have a rectangular convex shape as shown in FIG. 8.

While this embodiment illustrates a case where a part of the screen unit 31 constitutes the bulged section 332, the entire screen unit 31 may be a bulged section.

What is claimed is:

1. A display apparatus comprising:
    an image projecting unit which emits projection light of an image;
    a screen unit including:
        a Fresnel lens disposed correspondingly to the projection light; and
        a transmitting diffuser which includes a first display section that is disposed on a light-emitting side corresponding to a first area of the Fresnel lens and that is a flat area on which various pieces of information are displayed and a second display section that is disposed on the light-emitting side corresponding to a second area different from the first area of the Fresnel lens and that is an area on which projection light to produce a character image is projected, wherein a part of the second display section is separated from the Fresnel lens for a predetermined distance; and
    a voice output unit which outputs voice related to the various pieces of information.

2. The display apparatus according to claim 1, wherein a mouth of the character image displayed on the second display section moves in accordance with the voice emitted from the voice output unit.

3. The display apparatus according to claim 1, wherein the image projecting unit includes a projection lens, and
    wherein the Fresnel lens has a plate shape and is disposed approximately perpendicular to an optical axis of the projection light from the image projecting unit.

4. The display apparatus according to claim 2, wherein the image projecting unit includes a projection lens, and
    wherein the Fresnel lens has a plate shape and is disposed approximately perpendicular to an optical axis of the projection light from the image projecting unit.

5. The display apparatus according to claim 1, wherein the light-emitting side of the Fresnel lens has a sawtooth-shaped cross section.

6. The display apparatus according to claim 2, wherein the light-emitting side of the Fresnel lens has a sawtooth-shaped cross section.

7. The display apparatus of claim 5, wherein a light-receiving side of the Fresnel lens also has the sawtooth-shaped cross section.

8. The display apparatus according to claim 1, wherein the image projecting unit is a shift optical system disposed below one side of the screen unit.

9. The display apparatus according to claim 1, wherein the Fresnel lens converts the projection light projected from the image projecting unit into parallel light approximately perpendicular to a virtual plane confronting the screen unit.

10. The display apparatus according to claim 1, wherein a part of the second display section of the transmitting diffuser is matted.

* * * * *